June 4, 1935.  R. A. MILLER  2,003,383

PROCESS AND APPARATUS FOR BENDING GLASS SHEETS

Filed Dec. 18, 1933  9 Sheets-Sheet 1

INVENTOR
ROBERT A MILLER
BY
ATTORNEYS.

June 4, 1935.  R. A. MILLER  2,003,383
PROCESS AND APPARATUS FOR BENDING GLASS SHEETS
Filed Dec. 18, 1933  9 Sheets-Sheet 2

INVENTOR
ROBERT A MILLER
BY Bradley & Bee
ATTORNEYS.

June 4, 1935. R. A. MILLER 2,003,383
PROCESS AND APPARATUS FOR BENDING GLASS SHEETS
Filed Dec. 18, 1933 9 Sheets-Sheet 4

INVENTOR
ROBERT A MILLER
BY Bradley & Bee
ATTORNEYS.

June 4, 1935.   R. A. MILLER   2,003,383
PROCESS AND APPARATUS FOR BENDING GLASS SHEETS
Filed Dec. 18, 1933   9 Sheets-Sheet 6

INVENTOR
ROBERT A. MILLER
BY *Bradley + Bee*
ATTORNEYS.

June 4, 1935. R. A. MILLER 2,003,383
PROCESS AND APPARATUS FOR BENDING GLASS SHEETS
Filed Dec. 18, 1933 9 Sheets-Sheet 7

INVENTOR
ROBERT A. MILLER
BY Bradley & Bee
ATTORNEYS.

June 4, 1935.  R. A. MILLER  2,003,383

PROCESS AND APPARATUS FOR BENDING GLASS SHEETS

Filed Dec. 18, 1933   9 Sheets-Sheet 8

INVENTOR
ROBERT A. MILLER
BY
Bradley + Bee
ATTORNEYS.

June 4, 1935.  R. A. MILLER  2,003,383
PROCESS AND APPARATUS FOR BENDING GLASS SHEETS
Filed Dec. 18, 1933   9 Sheets-Sheet 9

INVENTOR
ROBERT A MILLER
BY
Bradley & Bu
ATTORNEYS.

Patented June 4, 1935

2,003,383

UNITED STATES PATENT OFFICE 2,003,383

PROCESS AND APPARATUS FOR BENDING GLASS SHEETS

Robert A. Miller, Tarentum, Pa., assignor to Pittsburgh Plate Glass Company, a corporation of Pennsylvania Application December 18, 1933, Serial No. 702,843

9 Claims. (Cl. 49—67)

The invention relates to a process and apparatus for bending glass and the like. The principal use of the invention is in bending glass sheets in pairs for making safety glass, and is so illustrated, but it will be understood that the process and apparatus are equally applicable in the bending of single sheets and may be of value in bending glass tubes or other glass articles. Heretofore it has been the practice to bend glass sheets, either in clay or metal molds. When clay molds are used, the glass sheet is placed on the mold in a furnace and the temperature is raised until the glass bends and conforms to the mold, after which the temperature is allowed to drop gradually until the glass reaches handling temperature. When metal molds are used, the mold and glass are separately preheated and the glass then placed on the mold, the temperature being raised until the glass will bend readily and conform to the mold. The mold carrying the bent sheet is then moved into a zone of lower temperature and after the sheet has set, it is removed from the mold and placed in an annealing kiln. The operation with either type of mold is slow and laborious and tends to mar the glass and give it a somewhat wavy or battered appearance. The present invention is designed to overcome the objectionable features incident to the old methods, the objects being to render the operation faster and cheaper, and to give a product whose surface is in no way impaired by the bending operation.

In practicing the improved process, open work or skeleton forms are preferably but not necessarily employed instead of the solid or continuous surface molds heretofore used, and these forms carrying the sheets to be bent are moved in series through a tunnel kiln, in which the glass is first bent and then annealed, as the forms carrying the sheets progress continuously through the kiln, which thus performs the double function of a bending kiln and annealing leer. The maximum temperature to which the glass is exposed, is preferably below the upper limit of the critical annealing range, namely below 1050 deg. F., and at such temperature, the glass will readily bend and conform to the skeleton mold, but will not mar. By proper regulation of the temperature and the period of exposure, the glass sheet may be made to follow closely the curvature of the skeleton form without any sagging or bowing intermediate the bar members of the form. Under these conditions, the curved sheet produced is free from any marks incident to contact with the form, and, if the sheet which is bent is plate glass, the surface of the sheet after the bending operation has the same optically true appearance, free from the waves and distortion such as is characteristic of plate glass when bent by the old method as heretofore described. Certain embodiments of the apparatus for practicing the improved process are shown in the accompanying drawings, wherein:

Fig. 7 is a sectional view similar to that of Fig. 2 showing a modification.

Referring to the construction of Figs. 1 to 6, 1 is a roller leer or kiln in which the rolls 2 are driven so as to carry the bending forms therethrough as hereinafter described. The temperature of this tunnel kiln or leer is regulated so that at one portion a temperature is maintained sufficient to cause the glass sheets carried therethrough to bend, such temperature ranging preferably between 950 and 1050 degrees F., which constitutes the critical annealing range of the glass. In another portion of the leer following that of the maximum temperature, the heat supplied to the leer is reduced so that the temperature of the glass is lowered gradually through the critical annealing range and preferably to a point where the glass may be handled conveniently. In operation, the bending forms with the sheets of glass to be bent carried thereby, are moved slowly through the kiln or leer in series, thus giving a continuous operation with operators at one end of the leer preparing the plates and forms for the bending operation, and operators at the other end of the leer removing the bent product and returning the forms to the entrance end of the leer.

Figure 1:
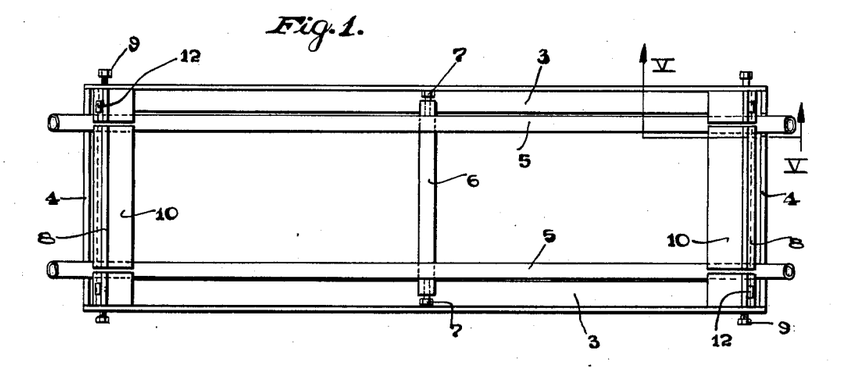
Figure 1 is a plan view of one of the forms or molds employed.
Figure 2:
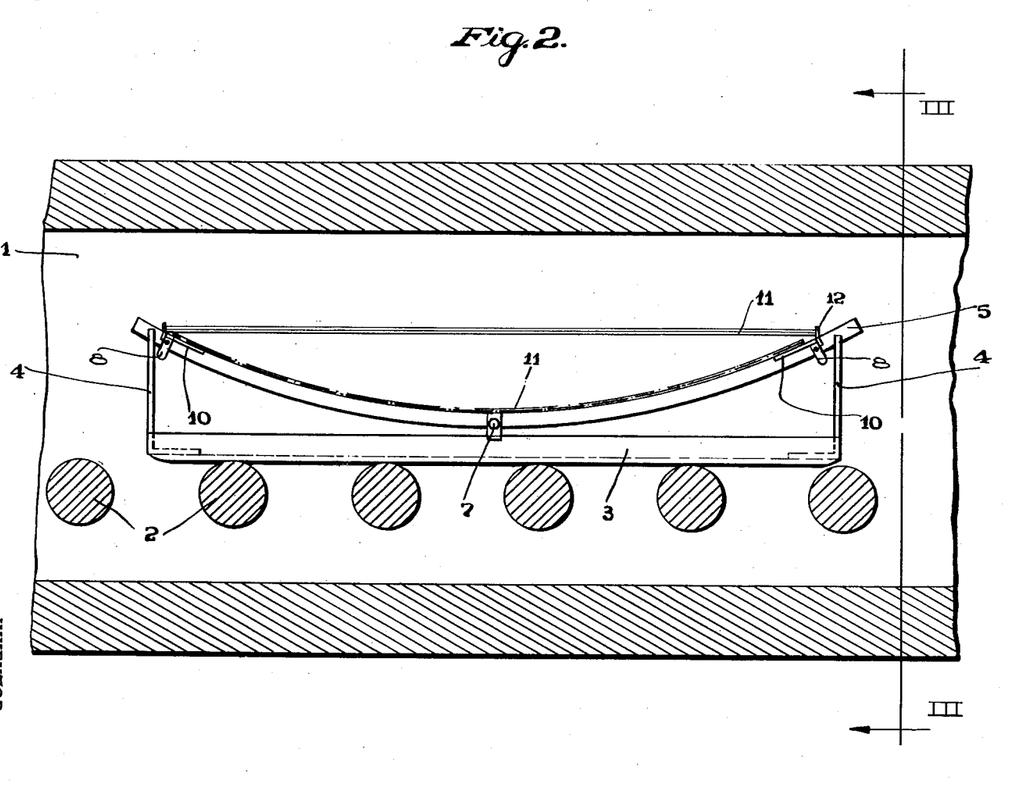
Fig. 2 is a section on the line II—II of Fig. 3 showing the form in side elevation in the heating kiln or leer.
Figure 3:
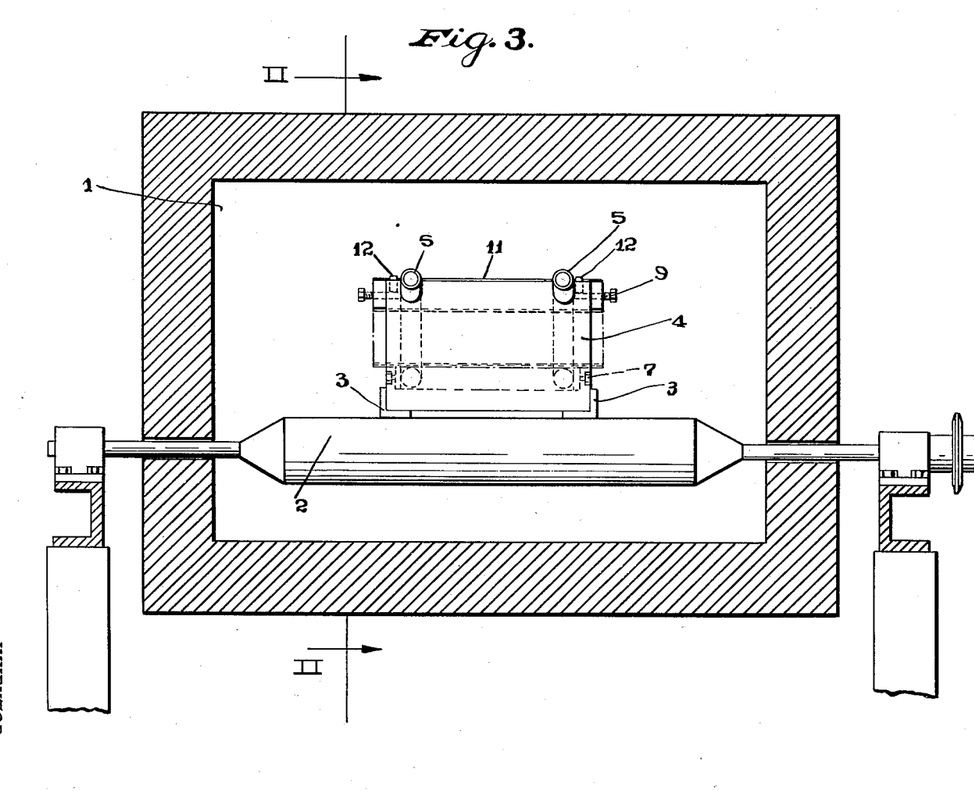
Fig. 3 is a section on the line III—III of Fig. 2.

The bending forms include a framework consisting of the angles 3, 3 secured together at their ends by the vertical plates 4, 4 which support the bending form or mold. The form of mold, in the particular embodiment illustrated comprises a pair of parallel pipes 5, 5 bent to the curvature to which it is desired to bend the glass plates. These pipes rest at their ends in recesses in the upper edge of the plates 4, 4 so that the pipes are free to expand endwise. This freedom to expand is highly desirable, as it reduces the tendency of the pipes to alter their curvature during the temperature changes to which the apparatus is exposed. The two pipes 5, 5 are preferably secured together midway between their ends by means of the tie member 6. This tie member may be in the form of a pipe having its upper edge in the same plane as the upper edges of the pipes 5, 5 at the ends of the tie bar. This tie bar holds the pipes 5, 5 in proper relative position, and opposes any tendency of the glass to sag between the members 5, 5, such as might occur if the glass is slightly overheated or remains in the heated area of the leer too long. The member 6 is provided at its end with blocks carrying the set screws 7, 7 for securing the tie member to the pipes. If the temperature conditions during the bending operation are kept low enough, the tie bar is not required for relatively narrow sheets, such as are used in windshields.

Figures 4, 6:
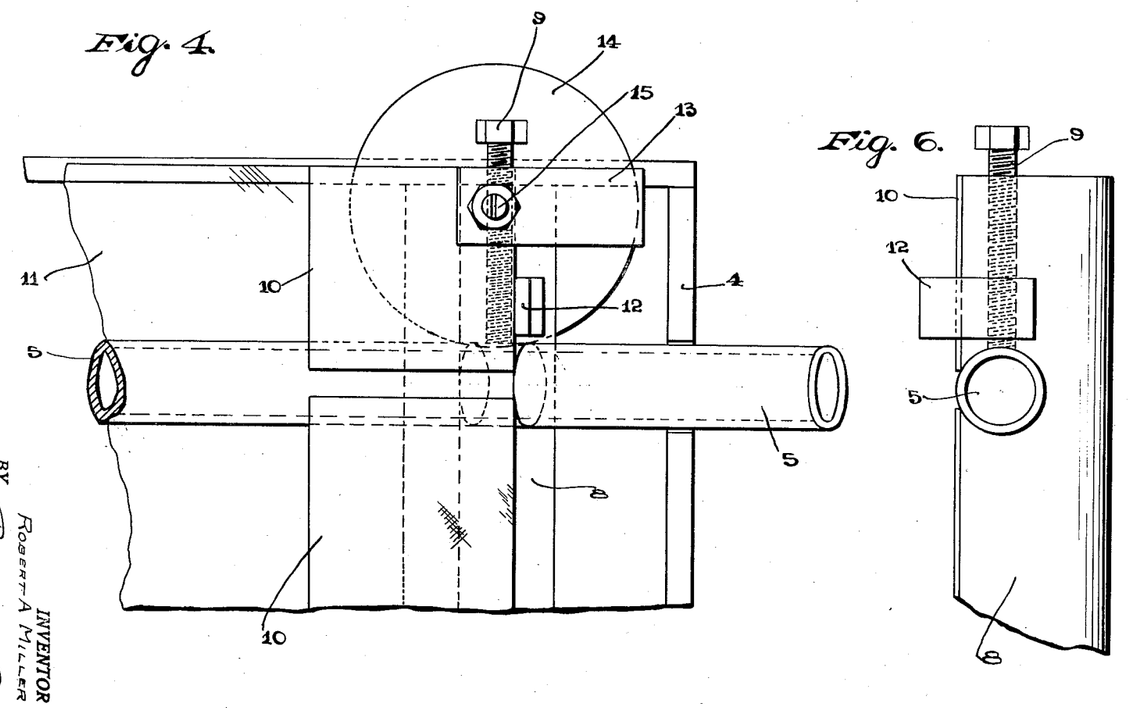
Figs. 4, 5 and 6 are enlarged detail views, Fig. 4 being a partial plan view, Fig. 5 a section on the line V—V of Fig. 1, and Fig. 6 an end elevation of the construction shown in Fig. 4.
Figure 5:
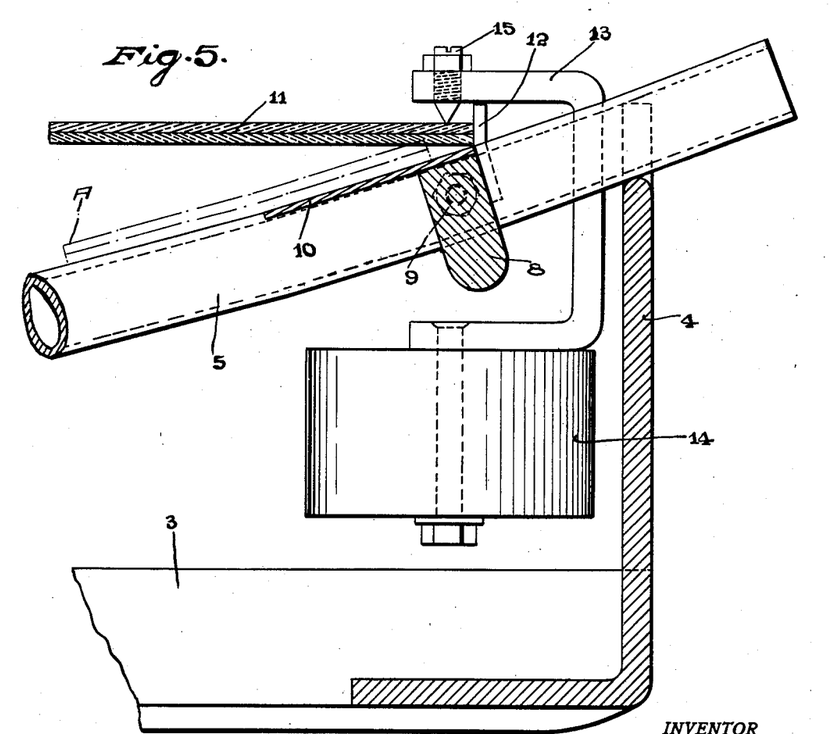

The pipes 5, 5 are also secured together at their ends by means of the tie bars 8 shown in detail in Figs. 4, 5 and 6. The pipes 5, 5 fit into suitable recesses in the tie bars 8, 8 and are clamped thereto by means of the set screws 9 which are threaded through the ends of the tie bars and engage the pipes. Welded to the upper face of each of the tie bars are the plates 10, 10 which serve as a support for the ends of the glass sheets 11, 11 during the bending operation. These plates 10, 10 lie with their upper surfaces on the level of the tops of the pipes 5, 5 and give support to the ends of the glass sheets 11, 11 as the glass bends down and slides along the plates to the dotted line position marked A in Fig. 5. The tie bars 8, 8 also carry stops or clips 12 projecting above the plates 10 and serving to square up the plates 11, 11 with respect to the form when the sheets are assembled upon the form preliminary to bending. These clips also serve to keep the sheets square with respect to the form until the bending operation is under way. After the bending operation is under way, there is no tendency of the glass sheets to move out of alignment with the form or relative to each other. Since the tie bars 8, 8 can be adjusted longitudinally of the pipes 5, 5, the stops or clips 12, 12 can be positioned to align the glass sheets when the forms are used with sheets of varying size. The pipes 5, 5 may be arranged to engage the glass sheets inward from the edges of such sheets, as illustrated, or at the extreme edges. In the latter case, any marring of the glass incident to its contact with the form will be at a location where it will be the least noticeable.

During the bending operation, there is a tendency for the corners of the glass sheets 11, 11 to bend upwards somewhat and in order to counteract this tendency, the clips 13 are preferably employed, one at each corner of the frame. These clips are provided with suitable weights 14, and have at their upper ends the pointed screws 15 preferably of very hard material, such are carboloy, which engage the upper surface of the top sheet of glass 11. This type of engagement tends to prevent the clip from slipping relative to the glass sheets and also provides a means for marking the upper sheet of glass. When the glass sheets 11, 11 are composited into a plate of safety glass, it is desirable that the relation of the two sheets in the composited glass should be the same as that when the sheets were bent, and the pointed crews 15 provide a means whereby the upper of the two sheets may be identified after such sheets are removed from the form or mold.

The glass sheets may be bent either in pairs, as indicated, or singly, and in carrying out the operation, the glass sheets to be bent are placed over the form, as indicated in Figs. 2 and 5 (full lines), and the form carrying the glass is inserted into the tunnel kiln 1 and carried therethrough. In the course of its passage through the leer or kiln, the glass is heated to a temperature at which it will bend and conform to the curvature of the pipes 5, 5, as shown by the dotted lines. This bending will occur at a temperature even below 950 deg. F. if sufficient time is given, but preferably the maximum temperature employed will range from 1000 to 1050 deg. F. and when the glass reaches this temperature, it will settle quickly of its own weight to the contour of the form. It is then carried forward through an area in the leer of gradually decreasing temperature so that the temperature of the glass drops uniformly through the critical annealing range, thus insuring proper annealing. The form and glass is then carried on further through the leer and preferably brought down to a temperature at which it can be conveniently handled. At the entrance end of the leer, the glass and its supporting form may be raised from atmospheric temperature, either rapidly or slowly, depending upon which is the most convenient method of operating the leer. The maximum temperature to which the glass is subjected in the leer is preferably such that the glass will bend to conform to the form, but will not mar by contact with the form. The glass is safe from any such marring action at a temperature of 1100 degrees F. or less. The temperature and period of exposure of the glass sheets should not be too great, even if there is no marring of the glass, as otherwise the glass may depart from its desired contour by sagging somewhat between the pipes 5, 5 although this may be counteracted to a large degree by the use of additional tie members, such as the member 6.

Fig. 7 illustrates a modification in the form construction. In this construction, the form is convex instead of concave, the pipes 16, which constitute the side members of the frame corresponding to the pipes 5, 5 of the first construction, being bent in the reverse direction so that the glass sheets 17 are supported at the center of the form. In this form of apparatus, the weight of the glass sheets is not as effective in causing a bending thereof, as is the case in the construction of Figs. 1 to 6, and in order to cause bending without the application of too high a degree of heat or too long a period of exposure, weights 18, 18 are preferably employed at the ends of the glass sheets, such weights being provided with pointed screws 19 similar to the screws 15 heretofore described for marking the glass and for preventing slippage as the sheets bend down and fit the pipes 16. In this construction, the frame which supports the pipes 16, 16 comprises a pair of angles 19a tied together by the transverse angles 20, the flanges of such angles 20 being recessed to receive the ends of the pipe 16, 16 so that such pipes may be free to expand and contract in the direction of their length. In order to align the plates with respect to the form and maintain them in such position until the bending is under way, the pipes are provided with suitable side clips 21, 21 which engage the side edges of the sheets 17.

Figure 8:
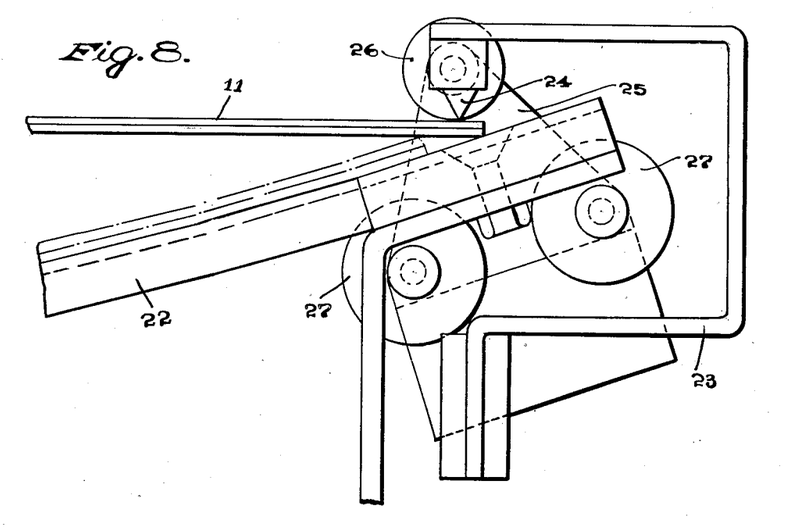
Figs. 8 and 9 are detail views illustrating a modification, Fig. 8 being a side elevation, and Fig. 9 an end view partially in section.
Figure 9:
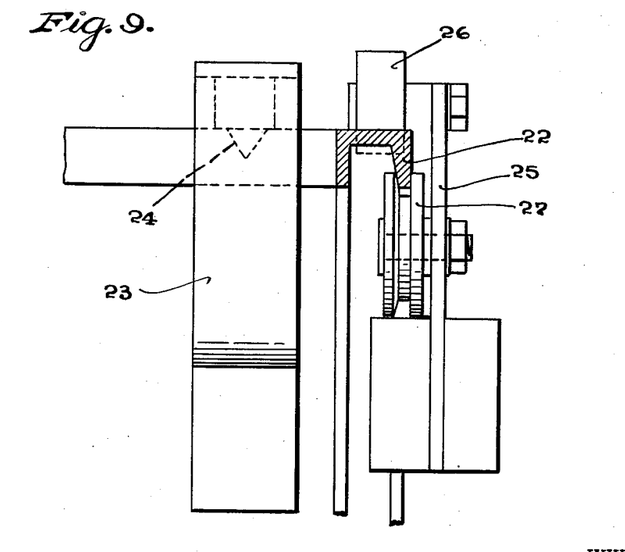
Figure 10:
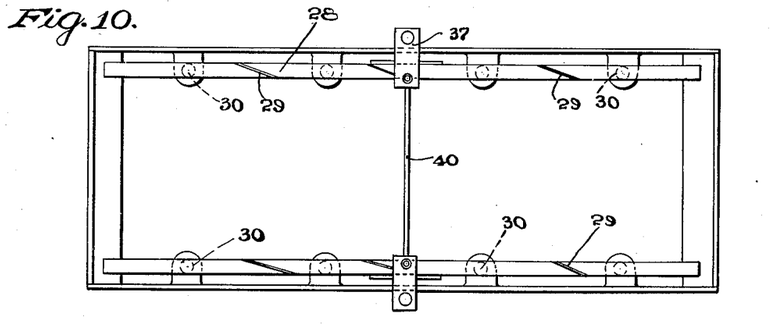
Figs. 10, 11, 12, and 13 illustrate a modification in which the curvature of the form is reversed, Fig. 10 being a plan view, Fig. 11 a side elevation, Fig. 12 a transverse section, and Fig. 13 an enlarged detail sectional view.
Figure 11:
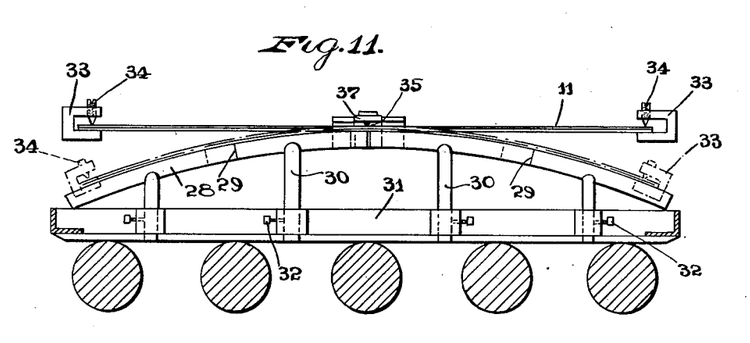
Figure 12:
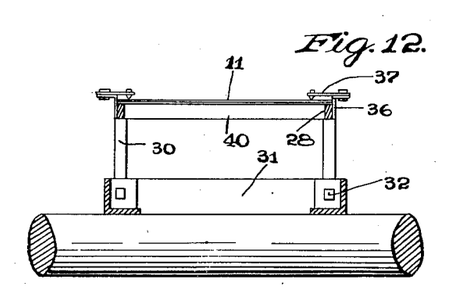
Figure 13:
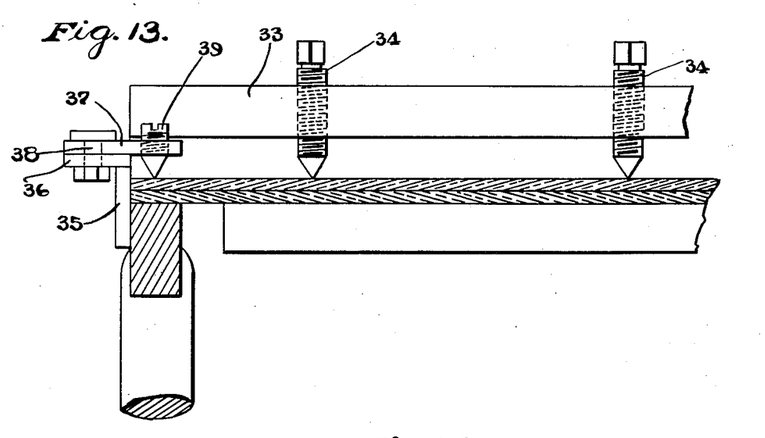

Figs. 8 and 9 illustrate a modification of the construction of Figs. 1 to 6, in which the side members corresponding to the pipes 5, 5 of Figs. 1 to 6 are in the form of the channels 22. In this construction, the corners of the glass sheets are held down by weighted clips 23 corresponding to the clips 13 of the Fig. 5 construction, such clips being provided with the pointed members 24 which engage the upper surface of the top sheet of glass 11. This type of construction is also provided with an accessory for applying a bending force to the glass sheets in addition to the bending force incident to the weight of the glass. The bending devices thus employed consist of four trolley members, one for each corner of the sheet, each consisting of a frame 25 provided with a roller 26 which rests upon the upper glass sheet 11 adjacent its edge. This trolley is provided with a pair of wheels 27 which engage the flange of the channel 22. In operation, the device is positioned, as indicated in Fig. 8, one at each corner of the sheet, and as soon as the sheets 11 begin to bend, the trolleys move by gravity toward the center of the form, thus applying a bending force which speeds up the settling of the glass sheets to conform to the curvature of the channels 22. By the use of these devices, it is possible to operate at a lower temperature than would otherwise be the case.

Figs. 10, 11, 12, and 13 illustrate a further modification of the type of form shown in Fig. 7. In this construction, the side members 28 are made in sections by the use of the diagonal cuts 29 (Fig. 10) and each section is carried by a post 30 which is adjustable vertically in the frame 31 and held in adjusted position by means of a set screw 32. This arrangement permits of an adjustment of the form and reduces the effect of any expansion and contraction incident to changes of temperature upon the members 28. As in the Fig. 7 construction, the glass sheets are provided with weights 33 to speed up the bending operation, such weights being clamped to the glass sheets by means of the pointed screws 34. In order to align the sides of the glass sheets and hold them in proper position with respect to the form, the members 28 at the center of the form are provided with side clips 35 which project up along the sides of the glass sheets. In order to still further secure the glass against movement, the members 35 are provided with brackets 36, on which are mounted the latches 37 pivoted at 38 and provided with pointed screws 39. After the plates are assembled, the latches 37 are swung to the position shown in Fig. 13 and the screws are tightened against the glass, thus preventing any relative movement between the glass sheets and any movement of the glass sheets longitudinally of the form. A tie bar 40 is preferably provided at the center of the form intermediate the side members 28.

Figure 14:
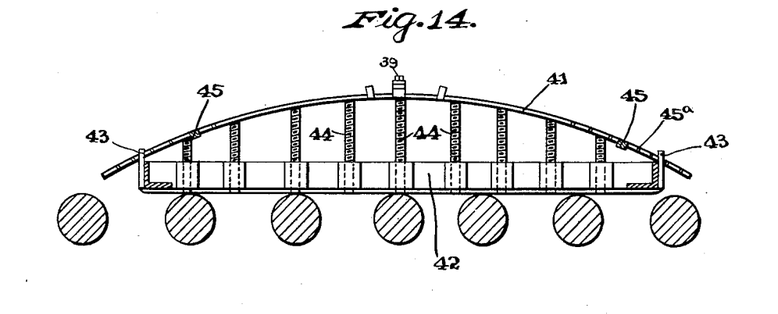
Figs. 14 and 15 illustrate a modification involving an adjustable form, Fig. 14 being a longitudinal section, and Fig. 15 an end elevation.
Figure 15:
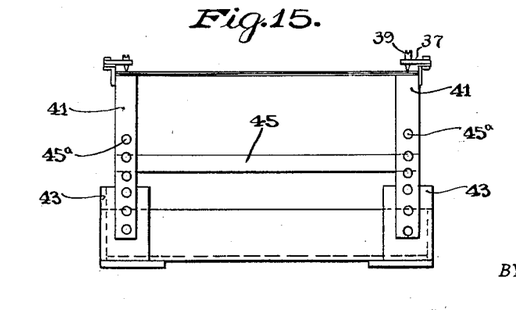

Figs. 14 and 15 illustrate an adjustable mold comprising the two flexible side bars 41, 41 carried by the frame 42 having at its ends the slotted plates 43, 43 through which the ends of the bars 41 extend. Spaced along the frame are a series of adjusting screws 44 threaded into suitable sockets on the frame members 41. By adjusting these screws, any desired curvature may be secured in the members 41. Transverse tie members 45 are preferably employed with this form in order to hold the side bars 41, 41 in proper relative position. These are made adjustable along the side members 41 by providing a plurality of screw holes 42 in the members 41 by means of which the ties may be secured to the bars by screws. This apparatus is provided at its center with holding latches 37 provided with screws 39 similar to corresponding parts in the Figs. 10 to 13 construction.

Figure 16:
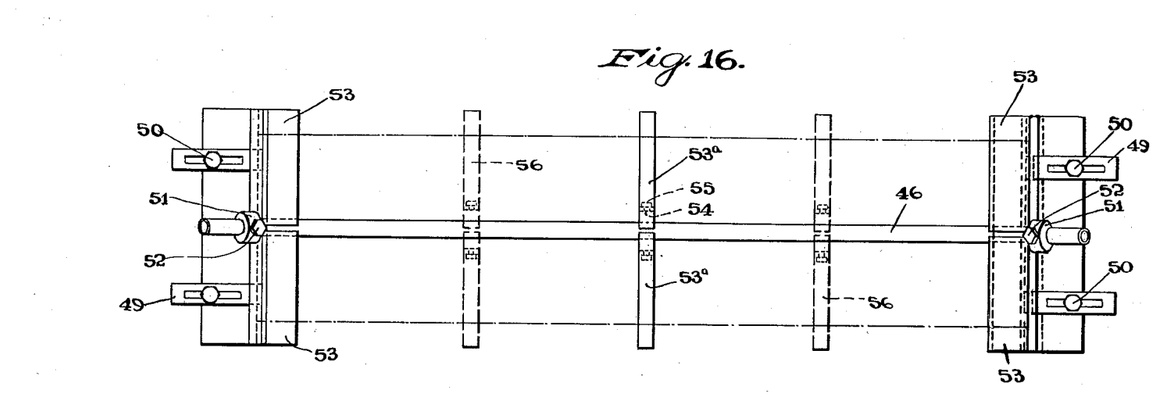
Figs. 16 and 17 are views similar to Figs. 1 and 2, but illustrating another modification.
Figure 17:
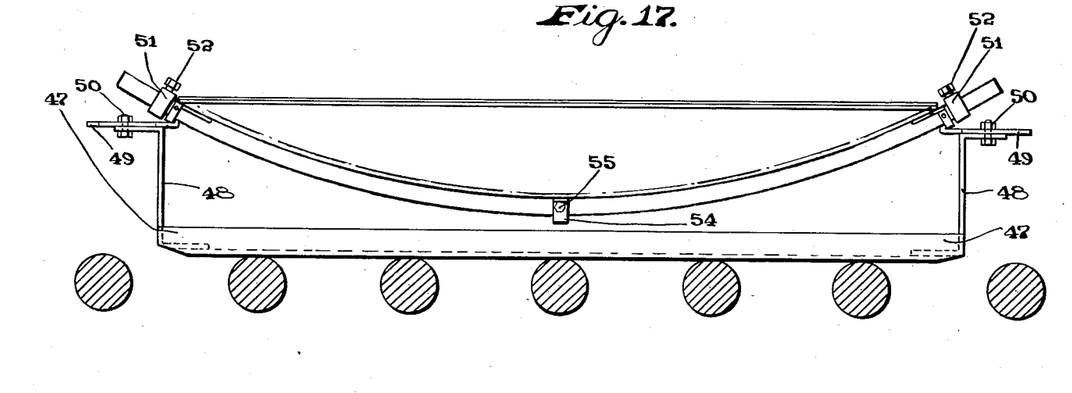

Figs. 16 and 17 illustrate a modification, in which the form to which the glass is bent, consists of a single bent pipe 46 which is located centrally with respect to the glass sheets to be bent. This pipe is carried in a frame consisting of the angle members 47 and the end plates 48, 48. The upper ends of the plates 48, 48 are flanged outwardly and carry supporting clips 49, 49 which are secured in position by the bolts 50 and adjustable longitudinally. At each end of the pipe 46 is a collar 51 held by a set screw 52 adjustable longitudinally of the pipe. This collar carries a pair of plates 53 for supporting the ends of the glass sheets and corresponding in function to the plates 10 of the Figs. 1 to 6 construction. The collars are supported by the members 49, 49 which are turned upward at their inner ends to provide a more secure support. A transverse support for the glass at the center of the pipe is provided in the form of the bar 53a secured to the pipe by means of the collar 54 and set screw 55. Other additional transverse supports may be provided, if desired, as indicated in dotted lines at 56, 56.

It will be noted that in all the different types of construction shown, the bending form is of skeleton construction. This is a very desirable feature of construction in the practicing of the applicant's process, although not an essential, as continuous forms of metal or clay might be used with substantially the same results in so far as the character of the product is concerned. A skeleton form is, however, preferable in most cases, since such forms heat and cool more rapidly and do not blanket the lower side of the glass, so that the application of heat to the glass and radiation therefrom is more uniform with the skeleton molds or forms. This is most important in that portion of the operation in which the glass is cooled down from the critical annealing range to the point at which it may be handled. With skeleton molds, this cooling down is accomplished in a fraction of the time which would be required with solid molds or forms, so that the capacity of the leer or kiln is much greater when the skeleton forms are used. To secure the same capacity of leer using solid or continuous forms, it would be necessary to divide the leer into two sections, in the first of which the glass is bent and carried through the critical annealing range, and in the second of which the glass is reduced from a temperature of about 950 degrees to handling temperature.

The operation of the second portion of the leer under these conditions would be speeded up by removing the bent glass plates from the molds at the end of the first section and sending the glass thus removed through the second portion of the leer. This would permit the prompt return of the forms or molds to the starting end of the first section of the leer, so that under these conditions of operation, a much smaller number of forms or molds would be required than would otherwise be the case.

It will, therefore, be understood that in so far as the process is concerned, the invention is not limited to the use of the skeleton forms or molds, although for most classes of work, and particularly long narrow sheets, such as windshield blanks, such forms have decided advantages for the reasons above indicated.

What I claim is:

1. A process of bending a glass sheet, which consists in supporting it above a skeleton form comprising spaced side members of the desired curvature adapted to engage the sheet along its longitudinal side edges, carrying the form and sheet through a heated area where the temperature of the sheet is raised to a point where it will bend and follow the outline of the side member but without sagging between such members, and then carrying them through an area of gradually decreasing temperature.

2. A process of bending a glass sheet, which consists in supporting it above a skeleton form comprising spaced side members of the desired curvature adapted to engage the sheet along its longitudinal side edges, carrying the form and sheet through a heated area where the temperature of the sheet is raised to a point where it will bend and follow the outline of the side member but not materially above 1050 deg. F., so that the sheet will not sag between said side members and then carrying them through an area of gradually decreasing temperature.

3. In combination in apparatus for bending glass sheets, a skeleton form of metal of the desired curvature supported for free endwise movement, and a member extending transversely of the form at each end for supporting the ends of the glass sheet.

4. In combination in apparatus for bending glass sheets, a skeleton form of metal of the desired curvature supported for free endwise movement, and means at the corners of the frame for applying pressure to the upper surface of the glass sheet at the corners thereof to prevent such corners from bending upward.

5. In combination in apparatus for bending glass sheets, a skeleton form of metal of the desired curvature supported for free endwise movement in the frame, and weighted hook members at the corners of the frame for applying pressure to the upper surface of the glass sheet at the corners thereof to prevent such corners from bending upward.

6. In combination in apparatus for bending glass sheets, a skeleton form of metal of the desired curvature supported for free endwise movement in the frame and weighted hook members at the corners of the frame provided with pointed members for applying pressure to the upper surface of the glass sheet at the corners thereof to hold such corners down and to mark them.

7. In combination in apparatus for bending glass sheets, a skeleton form of metal of the desired curvature supported for free endwise movement, and stop means carried by the form for lining up the glass sheets with respect to the form and for maintaining them in such relation preliminary to the bending of the sheets.

8. In combination in apparatus for bending glass sheets, a supporting frame, a form comprising a pair of parallel side members of metal shaped to the desired curvature and supported at their ends in the frame for free vertical movement, and a tie member between the side members intermediate their ends and adapted to prevent bowing of the glass sheets downward between the side members.

9. In combination in apparatus for bending glass sheets, a skeleton form of metal of the desired curvature, a heating passage, a conveyor adapted to carry the form with a glass sheet thereon through the passage, and means for heating the passage to a temperature at which the glass may be bent to follow the curvature of the form.

ROBERT A. MILLER.